United States Patent [19]

Cabrera

[11] Patent Number: 4,859,424
[45] Date of Patent: Aug. 22, 1989

[54] CONVERSION OF STACKED FCC UNIT
[75] Inventor: Carlos A. Cabrera, Northbrook, Ill.
[73] Assignee: UOP, Des Plaines, Ill.
[21] Appl. No.: 115,737
[22] Filed: Nov. 2, 1987
[51] Int. Cl.$^4$ ................................................. B01J 8/18
[52] U.S. Cl. .................................... 422/144; 29/401.1; 29/426.2; 29/469; 422/145; 422/146
[58] Field of Search .................... 29/401.1, 469, 426.2; 422/144, 146

[56] References Cited

U.S. PATENT DOCUMENTS

| | | | |
|---|---|---|---|
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,596,748 | 5/1951 | Watson et al. | 252/417 |
| 2,717,439 | 12/1956 | Bergstrom | 29/469 |
| 2,819,951 | 1/1958 | Medlin et al. | 23/288 |
| 2,862,798 | 12/1958 | McKinney | 23/288 |
| 2,873,175 | 2/1959 | Owens | 23/288 |
| 2,970,117 | 1/1961 | Harper | 252/417 |
| 3,274,745 | 9/1966 | Mcmanus et al. | 29/469 |
| 3,508,312 | 4/1970 | Burne et al. | 29/469 |
| 3,821,103 | 6/1974 | Owen et al. | 422/146 X |
| 3,844,973 | 10/1974 | Stine et al. | 252/417 |
| 3,923,606 | 12/1975 | Hausler | 203/7 |
| 3,958,953 | 5/1976 | Luckenbach | 23/288 B |
| 3,990,992 | 11/1976 | McKinney | 252/417 |
| 4,219,442 | 8/1980 | Vickers | 252/417 |
| 4,289,729 | 11/1981 | Myers et al. | 422/144 |
| 4,299,687 | 11/1981 | Myers et al. | 208/113 |
| 4,336,103 | 6/1982 | Katscher et al. | 376/245 |
| 4,371,501 | 2/1983 | Vickers | 422/146 X |
| 4,434,245 | 2/1984 | Lomas et al. | 502/2 |
| 4,439,533 | 3/1984 | Lomas et al. | 502/6 |
| 4,582,120 | 4/1986 | Walters et al. | 422/146 X |
| 4,595,567 | 6/1986 | Hedrick | 422/146 |
| 4,698,212 | 10/1987 | Walters et al. | 422/146 X |
| 4,710,357 | 12/1987 | Cetinkaya et al. | 422/146 X |

*Primary Examiner*—Michael S. Marcus
*Assistant Examiner*—Amalia L. Santiago
*Attorney, Agent, or Firm*—Thomas K. McBride; John G. Tolomei

[57] ABSTRACT

A method of converting a stacked FCC reactor-regenerator arrangement into a two-stage regenerator. In this method, a stacked FCC unit having a bottom regeneration vessel, a superadjacent reactor vessel, and a stripping vessel laterally offset from and in open communication with the reactor vessel are used to make a two-stage regenerator having a lower first stage of regeneration, an upper second stage regeneration vessel, and a catalyst cooler for moving heat from the catalyst. This method makes complete use of the three existing vessels in the stacked reactor regenerator arrangement by converting the upper reactor vessel into the second stage regeneration vessel and the stripping vessel into the catalyst cooler. Therefore, apart from the addition of a new reactor only relatively minor modifications are nesessary to convert the stacked reactor-regenerator arrangement into a two-stage regenerator. In this method, the stripping vessel can be converted into either a downflow type catalyst cooler or a backmix type catalyst cooler.

9 Claims, 3 Drawing Sheets

CONVERSION OF STACKED FCC UNIT

BACKGROUND OF THE INVENTION

1. Field of the Invention

This invention relates to the fluidized catalytic cracking (FCC) conversion of heavy hydrocarbons into lighter hydrocarbons with a fluidized stream of catalyst particles and regeneration of the catalyst particles to remove coke which acts to deactivate the catalyst. More specifically, this invention relates to the apparatus for performing the FCC process.

2. Description of the Prior Art

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. A high temperature regeneration within a regeneration zone operation burns coke from the catalyst. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones, and combusting coke in the regenerator are well known by those skilled in the art of FCC processes. To this end, the art is replete with vessel configurations for contacting catalyst particles with feed and regeneration gas, respectively.

One well known configuration of FCC unit that gained wide acceptance during the 1950's and 1960's is a stacked FCC reactor and regenerator. This design comprises a reactor vessel stacked on top of a regenerator vessel. Regenerated catalyst flows from the regeneration vessel through a regenerator standpipe into a riser where it contacts an FCC charge stock. Expanding gases from the charge stock and fluidizing medium convey the catalyst up an external riser and into the reactor vessel. Cyclone separators in the reactor divide the catalyst from reacted feed vapors which pass into an upper recovery line while the catalyst collects in the bottom of the reactor. A stripping vessel, supported from the side of the reactor vessel, receives spent catalyst from the reaction zone. Steam rises from the bottom of the stripper, countercurrent to the downward flow catalyst, and removes sorbed hydrocarbons from the catalyst. Spent catalyst continues its downward movement from the stripper vessel through a reactor standpipe and into a dense fluidized catalyst bed contained within the regeneration vessel. Coke on the spent catalyst reacts with oxygen in air stream that ascends through the regeneration vessel and ultimately becomes regeneration gas. Again, cyclone separators at the top of the regenerator return catalyst particles to the dense bed and deliver a relatively catalyst-free regeneration gas to an overhead gas conduit.

Changes in regeneration technique, types of available feedstock, and higher throughput requirements have greatly diminished the utility and viability of these stacked arrangements. Since the introduction of the stacked FCC arrangement, two particularly useful additions to regeneration technique include multiple stage regeneration and the addition of means to remove heat from the regenerator. The major impetus for adopting these changes is the need to improve conversion of a wide variety of feedstocks.

Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 weight percent coke. In order to obtain complete regeneration, oxygen in excess of the stoichiometric amount necessary for the combustion of coke to carbon oxides is charged to the regenerator. Excess oxygen in the regeneration zone will also react with carbon monoxide produced by the combustion of coke thereby yielding a further evolution of heat. When CO combustion occurs in a relatively catalyst-free zone of the regenerator, such as the region above the dense fluidized bed in a single regenerator vessel, the resulting high temperatures may lead to severe equipment damage. Such situations may be avoided if the CO combustion takes place in the presence of catalyst particles which act as a heat sink. Therefore, regenerators are generally designed to avoid the combination of free oxygen and carbon monoxide in regions that are relatively free of catalyst. Despite this, the heat evolved from unintended CO combustion may raise the temperature of the catalyst to the point of causing thermal deactivation of the catalyst or may affect the process by limiting the amount of catalyst that can contact the feedstock. The problems of controlling catalyst and regenerator temperatures are exacerbated by the application of FCC processes to crack heavy feedstocks. With the increased coke producing tendencies of these heavy or residual feeds, a complete regeneration of catalyst becomes more difficult due to the excessive heat evolution associated with coke and CO combustion. A common approach to minimizing CO combustion while yet obtaining fully regenerated catalyst has been to perform the regeneration in stages.

Apart from the objective of minimizing CO combustion, the increase in coke on spent catalyst results in a larger amount of coke being burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and the regenerated catalyst temperature overall. A reduction in the amount of catalyst circulated is, therefore, necessary in order to maintain the same reactor temperature. However, this lower catalyst circulation rate required by the higher temperature difference between the reactor and the regenerator will lower hydrocarbon conversion, making it necessary to operate with a higher reactor temperature in order to maintain conversion at the desired level. This will cause a change in yield structure which may or may not be desirable, depending on what products are required from the process. Also, there are limitations to the temperatures that can be tolerated by FCC catalyst without there being a substantial detrimental effect on catalyst activity. Generally, with commonly available modern FCC catalyst, temperatures of regenerated catalyst are usually maintained below 760° C. (1400° F.), since loss of activity would be very severe at about 760°–790° C. (1400°–1450° F.). If a relatively common reduced crude such as that derived from Light Arabian crude oil were charged to a conventional FCC unit, and operated at a temperature required for high conversion to lighter products, i.e., similar to that for a gas oil charge, the regenerator temperature would operate in the range of 870°–980° C. (1600–1800° F.). This temperature would be too high a temperature for the catalyst, require very expensive materials of construction, and give an extremely low catalyst circulation rate. It is, therefore, accepted that when materials are processed that would give excessive regenerator temperatures, a means must be provided for removing heat from the regenerator, which enables a lower regenerator temperature, and a lower temperature difference between the reactor and the regenerator to be obtained.

INFORMATION DISCLOSURE

Staged regeneration systems are well known in the regeneration of FCC catalyst. Luckenbach, U.S. Pat. No. 3,958,953, describes a staged flow system having concentric catalyst beds separated by baffles which open into a common space for collecting spent regeneration gas and separating catalyst particles. Myers et al. in U.S. Pat. No. 4,299,687 teach the use of a staged regenerator system having superimposed catalyst beds wherein spent catalyst particles first enter an upper dense fluidized bed of catalyst and are contacted with regeneration gas from the lower catalyst bed and fresh regeneration gas. After partial regeneration in the first regeneration zone, catalyst particles are transferred by gravity flow into a lower catalyst bed to which is charged a stream of fresh regeneration gas. The Myers invention is directed to the processing of residual feeds and uses the two-stage regeneration process to limit CO combustion thereby reducing overall heat output within the regenerator.

The use of relatively dilute phase regeneration zones to effect complete catalyst regeneration is shown by Stine et al. in U.S. Pat. Nos. 3,844,973 and 3,923,606. Stine et al. seeks primarily to effect complete CO combustion for air pollution, thermal efficiency, and equipment minimization reasons by using increased gas velocities to transport catalyst through dense bed and relatively dilute phase regeneration zones. A two-stage system which combines a relatively dilute phase transport zone with a dense bed zone for regenerating catalyst used in cracking residual feeds is shown by Dean et al. in U.S. Pat. No. 4,336,103. In Dean, a first dense bed is used to initiate coke combustion in a lower portion of a regeneration section which is followed by an upper dilute phase regeneration section operating at high severity to complete regeneration and combustion of carbon monoxide. Dean's method uses a modified version of a stacked FCC configuration wherein the dense regeneration portion is the regeneration vessel of the stacked configuration and the dilute phase regeneration takes place in an additional vessel located to the side of the stacked configuration.

A common prior art means for removing heat from a regenerator provides coolant filled coils within the regenerator which are in contact with the catalyst. For example, Medlin et al. U.S. Pat. No. 2,819,951, McKinney U.S. Pat. No. 3,990,992, and Vickers U.S. Pat. No. 4,219,442 disclose fluid catalytic cracking processes using dual zone regenerators with cooling coils positioned in the second zone. The prior art is also replete with disclosures of FCC processes which utilize dense or dilute phase regenerated fluid catalyst heat removal zones or heat exchangers, that are external to the regenerator vessel, to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123; and Lomas et al. U.S. Pat. No. 4,434,245. Another U.S. Pat, No., 4,439,533 issued to Lomas et al. shows an external heat removal zone in which catalyst is circulated between the heat removal zone and the regeneration vessel across a single passage that communicates the two zones.

Since the stacked type FCC arrangements were normally designed to operate with only a single stage of regeneration and did not contain any provision for external heat removal from the catalyst, the stacked arrangement in its present form cannot accommodate two stage regeneration and catalyst heat removal. The perceived need for extensive modification greatly reduces the viability of the existing, stacked FCC configurations. Furthermore, it is common to find stacked FCC units where the single stage of regeneration operates in a partial CO combustion mode. Typically, when operated for partial CO combustion, the regeneration vessel will contain equipment that is unsuitable for the higher temperatures that accompany complete CO regeneration. The need to upgrade equipment in many stacked FCC configurations for present day operating practice further reduces the current utility of these units.

A number of stacked configurations have been upgraded to accommodate higher operating temperature. Common approaches to this type of upgrading include the replacement of internal equipment with more heat resistant equipment and the use of internal insulation or external convection devices to reduce the skin temperature of metal components such as conduits and vessel shells. In this regard it is commonly found that the metallurgy of old reactor vessels is unsuitable for the increased reactor temperatures that are now preferred. The limitation on reactor temperature places a constraint on conversion and provides an incentive to refiners to replace the reactor vessel.

The present invention provides a method for utilizing a majority of the existing structures associated with a stacked FCC arrangement as part of a new FCC configuration having two stage regeneration and an external heat removal section. This conversion also allows the owner of an existing stacked FCC configuration to greatly increase the processing capacity of the unit, including the processing of heavier feedstocks, while minimizing capital expenditure for new equipment. Minimization of capital expenditure is achieved by utilization of the reactor vessel, regeneration vessel and stripper vessel from the stacked configuration.

SUMMARY OF THE INVENTION

This invention is a method of converting a stacked FCC arrangement to a regenerator having at least two stages of regeneration that is used as part of an enlarged FCC process. In simplest form the conversion method calls for the use of the regeneration vessel as a first-stage regeneration zone, the use of the reactor vessel as a second-stage regeneration zone, and the use of the reactor stripper as a catalyst heat removal zone.

Accordingly in one embodiment, this invention is a method of converting a stacked FCC reactor regenerator arrangement into a two-stage regenerator where the stacked configuration has a bottom regeneration vessel, a superadjacent reactor or upper vessel, an external conduit for withdrawing catalyst from the lower portion of the regenerator vessel and transporting catalyst to the reactor vessel, means for adding spent catalyst to the regenerator vessel, means for recovering regeneration gas from an upper portion of the regenerator vessel, and a stripping or side vessel laterally offset from and in open communication with the reactor vessel. In this conversion method, the upper vessel is modified to function as a second stage regeneration vessel by adding means for collecting catalyst to the lower portion of the upper vessel, the catalyst collection means communicating with a catalyst withdrawal line for withdrawing catalyst from the upper vessel, and providing means for recovering regeneration gas from the upper end of the vessel. A heat exchanger for withdrawing heat from and means for distributing fluidizing gas into the side vessel are added so that the former stripping vessel will function as an external catalyst heat removal zone. The external catalyst conduit is also modified as necessary to contain a lift gas injector.

In another aspect of this invention, the external conduit for transporting catalyst from the regenerator to the upper vessel is operated as a yet additional regeneration zone.

Other embodiments and aspects of the present invention encompass further details related to the replacement and addition of equipment to effect modification of the unit and the operation of the unit modified in accordance with this invention.

DETAILED DESCRIPTION OF THE INVENTION

The present invention in its method aspects consists of steps for changing the function of an existing stacked FCC arrangement. Arrangements to which this method can be applied will have an upper reactor vessel stacked above a lower regeneration vessel and a stripping vessel in communication with and supported dependently from the reactor vessel. It is anticipated that this method of conversion will accompany the addition of a new reactor vessel located to the side of the existing stacked arrangement. Therefore, the utilization of this invention will usually be accompanied by an increase in the feed processing capacity of the final FCC configuration. Thus, this invention will generally be applicable to any stacked arrangement as further described herein provided the addition of a new reactor vessel is also possible.

Figure 1:
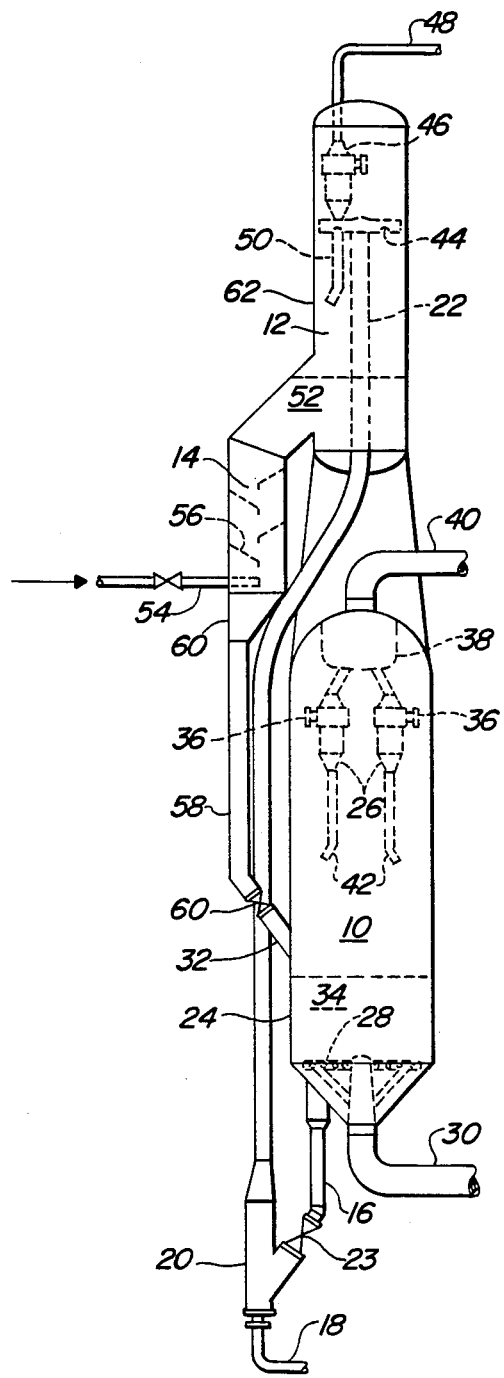
FIG. 1 is a sectional elevation view of a stacked FCC arrangement before modification.

Reference is now made to FIG. 1 in order to show the type of stacked FCC configuration to which the method of this invention may be applied. Looking then at FIG. 1, a traditional stacked FCC arrangement will have a regeneration vessel 10, a reactor or upper vessel 12, and a stripping or side vessel 14. A regenerated catalyst conduit 16 transfers catalyst from the regenerator through a control valve 23 and into a riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into internal riser conduit 22. As the catalyst and feed pass up to the riser, the hydrocarbon feed cracks to lower boiling hydrocarbon products.

Riser 22 discharges the catalyst and hydrocarbon mixture through openings 44 to effect an initial separation of catalyst and hydrocarbon vapors. Outside openings 44, a majority of the hydrocarbon vapors continue to move upwardly into the inlet of cyclone separator 46 which effects a near complete removal of catalyst from the hydrocarbon vapors. Separated hydrocarbon vapors exit reactor 12 through an overhead conduit 48 while a dip leg conduit 50 returns separated catalyst to a lower portion of the reactor vessel. Catalyst from riser outlets 44 and dip leg conduit 50 collects in a lower portion of the regenerator forming a bed of catalyst 52. Bed 52 supplies catalyst to stripping vessel 14. Steam entering stripping vessel 14 through a conduit 54 rises countercurrent to a downward flow of catalyst through the stripping vessel thereby removing sorbed hydrocarbons from the catalyst which are ultimately recovered with the steam by cyclone separator 46. In order to facilitate hydrocarbon removal, a series of downwardly sloping baffles 56 are provided in the stripping vessel 14. A spent catalyst conduit 56 removes catalyst from a lower conical section 60 of stripping vessel 14. A control valve 60 regulates the flow of catalyst from conduit 58.

Regeneration gas, such as compressed air, enters regenerator 10 through a conduit 30. An air distributor 28 disperses air over the cross-section of regenerator 10 where it contacts spent catalyst in bed 34. Coke is removed from the catalyst by combustion with oxygen from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 for removing spent regeneration gas from the regenerator. Catalyst, separated by the cyclones drops from the separators through dip leg conduits 42 and returns to bed 34.

The catalyst and hydrocarbon mixture entering the reactor vessel through outlets 44 usually will have a temperature of less than 540° C. (1000° F.). For this reason, the shell 62 of the reactor and stripper vessels typically comprise an unlined carbon steel or low chrome material. Similarly, internal equipment within the reactor vessel and stripper, such as cyclone separator 46, internal riser 22, and baffles 56, have a similar metallurgy. Thus, as usually encountered, the reactor and stripper vessels along with the internals cannot be used for a second stage of regeneration which is carried out at temperatures above 540° C. (1000° F.). Accordingly, without modification to withstand higher temperatures, the reactor and stripper vessels are unsuitable for the second stage of regeneration in a two-stage regeneration process. Regeneration vessel 10 will typically have a refractory lined metal shell 24 which is capable of withstanding temperatures within the regenerator in excess of 815° C. (1500° F.). Thus, the regenerator vessel itself is suitable for high operating temperatures.

However, other major equipment within the regenerator including cyclone separators 26 and air distribution device 28 may be unsuitable for high temperature operation. As a result, it may be possible to use the internal regeneration equipment in the first stage of a two-stage regeneration process. Looking then at FIG. 2, the stacked arrangement of FIG. 1 is shown in modified form as part of the two-stage regeneration system for a new FCC configuration. The two-stage configuration has a reactor vessel 64 close to the side of upper vessel 12 and regenerator vessel 10. Reactor 64 is arranged for a riser cracking type operation which is well known to those skilled in the art. In this operation, regenerated catalyst enters a WYE section 66 where it contacts hydrocarbon feed entering the WYE section through pipeline 68. Expanding hydrocarbon vapor and in some cases fluidizing medium which may also enter through pipeline 68 carry the catalyst upward through an external riser 70 and an internal riser 72. The outlets of riser 72 and a pair of cyclones separators 74 separate catalyst and hydrocarbon vapors in the manner previously described for reactor vessel 12 so that hydrocarbon vapors leave reactor vessel 64 through an upper vapor line 74 while the catalyst is returned to the bottom of reactor vessel 64. From the bottom of reactor vessel 64, catalyst passes downwardly through a stripping vessel 76 in countercurrent flow to steam which is injected through a distributor 78. Catalyst from the bottom of stripping vessel 76 which now contains between 0.05 and 2.0 wt. % coke returns to the regenerator vessel via a reactor catalyst conduit 80.

Typical metallurgy for cyclone separators 26 and air distribution device 28 will vary from low chrome metals to stainless steels with the former generally having a temperature limitation of about 650° C. (1200° F.) and the latter being able to withstand temperatures up to 790° C. (1450° F.).

Reactor vessel 64 and the equipment attached thereto now replace the function of upper vessel 12 and side vessel 14 so that these vessels and the rest of the stacked regeneration configuration may be modified in accordance with this invention to provide additional regeneration capacity and flexibility. For a typical stacked arrangement, addition of the reactor and conversion of the existing vessels will generally provide a 20 to 60% increase in feed capacity.

Figure 2:
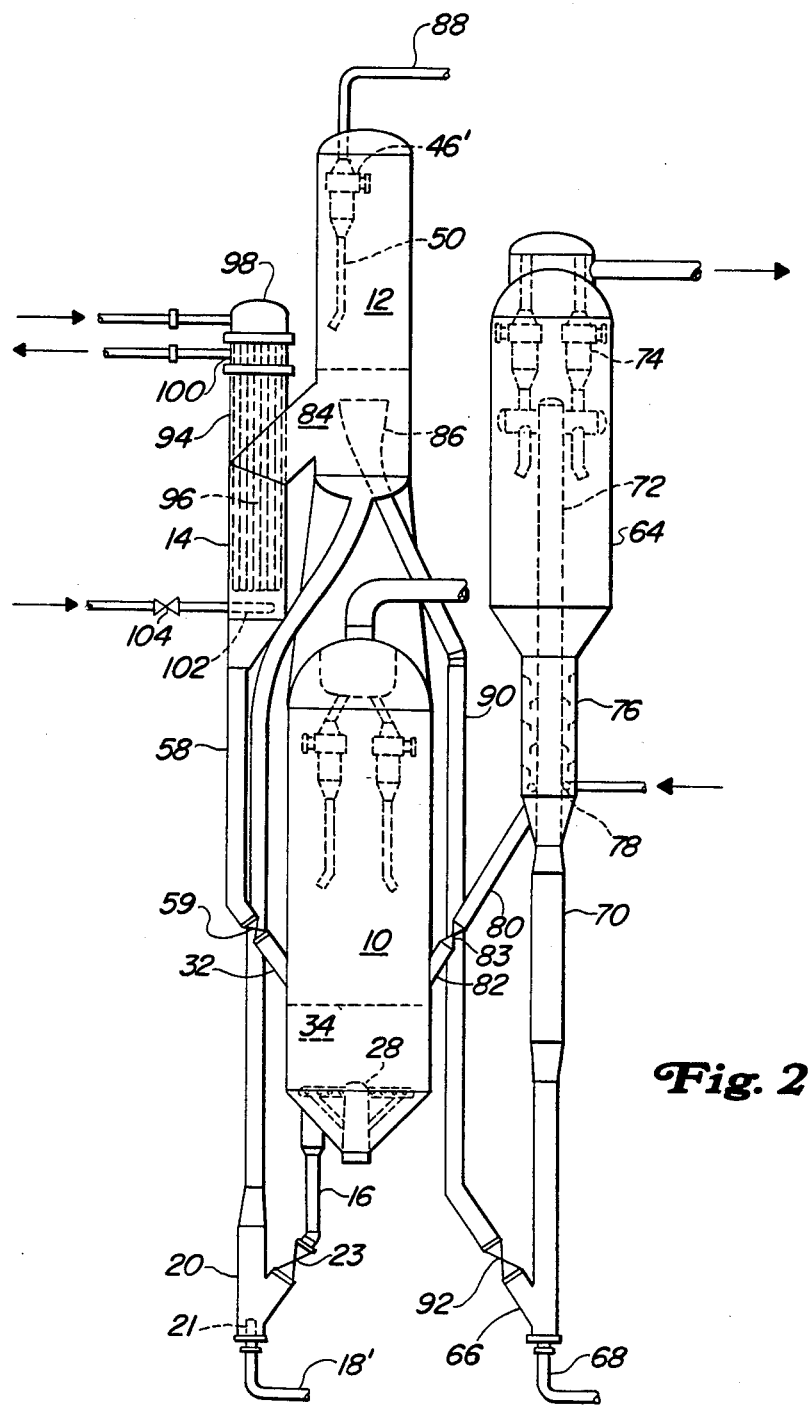
FIG. 2 is a sectional elevation view of an FCC configuration including a stacked FCC arrangement modified in accordance with this invention.

FIG. 2 also shows the modifications to the stacked regeneration arrangement which starting with the regenerator include the addition of conduit 80 and a slide valve 83 for carrying spent catalyst and regulating its transfer from the reactor 64 to regenerator vessel 10. In the configuration of FIG. 2, a new inlet nozzle 82 is added to the side of regenerator 10 to communicate conduit 80 with the interior of the regenerator. A new nozzle is necessary in this case since nozzle 32 is still used to deliver catalyst from side vessel 14 to the regenerator. Regenerator 10 will function as a first stage regeneration zone again having a dense bed 34. Apart from the addition of nozzle 82, regenerator 10 operates in substantially the same manner as previously described.

Preferably, the first stage of regeneration is operated in a partial CO combustion mode. In this type of operation, the first stage of regeneration will remove about 50-90% of the coke on the entering spent catalyst. In order to reduce operating temperatures and oxygen requirements, the first regeneration stage may perform only a partial oxidation of the carbon monoxide produced during coke combustion. The resulting lower temperatures and lower air addition requirements from this type of operation will facilitate the use of existing equipment within some regenerators. In regenerators where the cyclone separators 36 and air distribution device 28 are made of low alloy metal, lower regenerator temperatures, particularly those below 650° C. (1200° F), will prolong the operating life of these materials. In addition, the air distribution device may be designed for air flow rates which are too low to supply the total oxygen demands that would be necessary to combust all of the coke and carbon monoxide in regeneration vessel 10. However, since the first stage regeneration zone only uses between 30 to 70% of the air required for complete coke and CO combustion, air distribution device 28 may be suitable for the first stage of regeneration without substantial modification.

Catalyst is again withdrawn by regenerated catalyst conduit 16 at a rate determined by control valve 23. However, in this case, the catalyst entering riser conduit 20 is only partially regenerated. Air entering through a conduit 18' contacts the partially regenerated catalyst in the bottom of riser 20 to initiate further combustion of coke from the catalyst particles. In this manner, riser 20 can function as an additional regeneration zone. The air also functions as a lift gas by transporting the catalyst particles upward through riser 20 and into the bottom of upper vessel 12. An air distribution device is provided for injecting air from line 18' into riser 20. This device can consist of a simple open pipe 21 as shown in FIG. 2. For a very large riser, the distribution can comprise multiple outlets spaced over the inside diameter of riser 20. Since the temperature of the partially regenerated catalyst entering line 16 and the lower portion of riser 20 will normally be as low or lower than the temperature of the catalyst that entered this region before conversion of the unit, the existing components will normally be suitable for the use in the two-stage configuration. As combustion of coke and coke by-products continues as catalyst moves up the riser, the upper portion of the riser 20 will have equal or higher operating temperatures relative to the lower portion of riser 20. This temperature situation is opposite to what occurs when upper vessel 12 is used as a reactor and temperatures fall as the catalyst rises. Therefore, the existing upper portion of conduit 20 may not be suitable for the higher temperatures (usually above 650° C. (1200° F.)) associated with complete regeneration of the catalyst. Accordingly, it may be necessary to replace the upper portion of line 20 with a pipe section made of higher metallurgy such as stainless steel or having internal thermal insulation. In the alternative, the metal temperature of the metal of riser 20 can be reduced by removing external insulation thereby permitting convection cooling of the pipe surface. To a minor degree, this convective cooling also has the advantage of removing heat from the catalyst and lowering the overall catalyst temperatures in upper vessel 12 which in turn reduces the required amount of catalyst cooling. Thus, the riser 20 can provide additional means of cooling when all of the insulation is removed therefrom.

Upper vessel 12 functions as a disengaging vessel and, to the extent required, a second stage combustion zone. Upper vessel 12 can be operated as a combustion zone when unconverted coke or coke by-products enter upper vessel 12 with catalyst from riser 20. A dense bed 84 is maintained in vessel 12 and receives catalyst from riser 20. Dense bed 84 has a level at or above an internal hopper 86. Internal riser 22 is removed to make room for hopper 86. Spent regeneration gas and entrained catalyst travel upward from bed 84 and enter a cyclone separator 46' where gas is separated from the catalyst and recovered overhead by conduit 88 while catalyst particles are returned to bed 84. Spent regeneration gas for the complete regeneration operation of vessel 12 will contain 1 to 10% excess oxygen. Due to the higher temperatures associated with the complete regeneration operation, cyclone separator 46 is replaced with a new cyclone separator made of stainless steel material. Hopper 86 collects fully regenerated catalyst particles from bed 84 which are removed from upper vessel 12 by a regenerated catalyst conduit 90 that delivers the catalyst particles to WYE section 66.

In the embodiment of FIG. 2, catalyst is also withdrawn from bed 84 into side vessel 14. Catalyst can be again taken from the bottom of vessel 14 and delivered to regenerator 10 by conduit 58 which now functions as a cooler conduit. Vessel 14 is modified by the addition of a cooler shell 94 and the insertion of heater exchanger tubes 96. Heater exchanger tubes 96 are of a bayonette type. A cooling fluid, typically water or saturated steam, enters a distributor head 98 which distributes the fluid to the bayonette tubes. Fluid leaving the bayonette tubes is recovered in a chamber 100 and withdrawn from the cooler. Contact of the catalyst with cooling tubes 96 removes heat from the regeneration section and provides a source of relatively cool catalyst particles. The cooler may be operated in a downflow mode to transport relatively cool catalyst particles, via a conduit 58, into the first stage regeneration zone of vessel 10. The cooler may also be operated in a backmix mode wherein catalyst is circulated between tubes 96 and dense bed 84.

The fluidizing gas, typically air, enters vessel 14 at a point below tubes 96 through a distributor 102. A control valve 104 regulates the flow for fluidizing medium into distributor 102. A small amount of fluidizing medium is introduced to facilitate catalyst flow through the cooler and promote a good distribution of catalyst around tubes 96. As downward flow of catalyst through vessel 14 is interrupted by control valve 59, an increased amount of air can be added through distributor 102 to increase the amount of catalyst backmixing with dense bed 84. Additional information on the operation of catalyst coolers can be obtained from the previously cited references.

Figure 3:
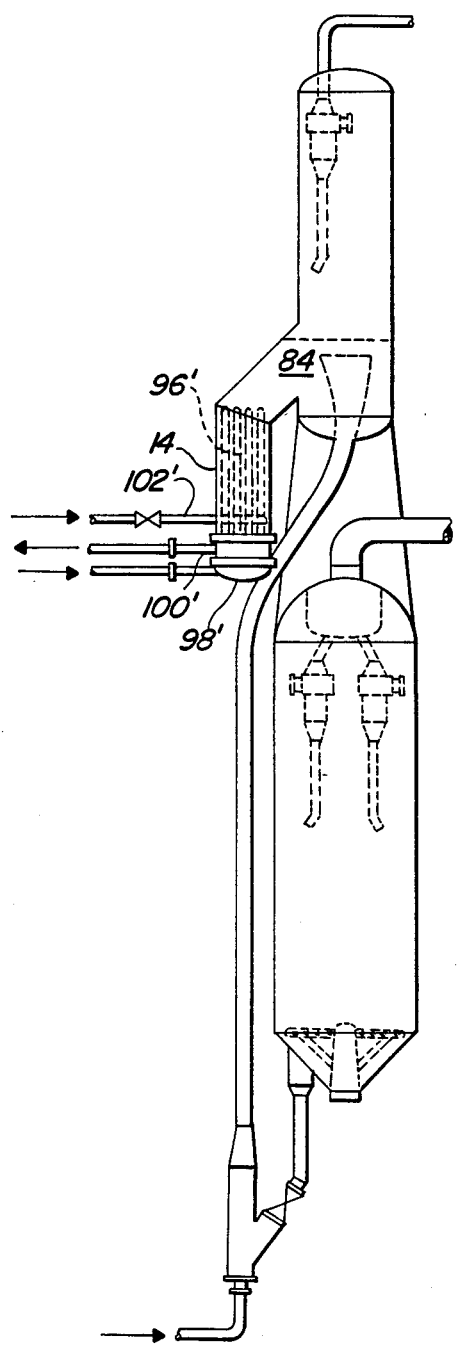
FIG. 3 is a partial sectional elevation view of a stacked FCC arrangement modified in accordance with this invention and showing an alternate arrangement for the catalyst heat removal zone.

In an alternative and somewhat simpler embodiment, vessel 14 may house a catalyst cooler that is only operated in the backmix mode. FIG. 3 illustrates this embodiment where the lower portion of vessel 14 is closed by a chamber 100' and a distributor head 98'. In FIG. 3, the heater exchanger tubes 96' extend upward from the chamber and distributor head. Fluidizing gas enters vessel 14 through a distributor 102' located near chamber 100'. In this type of operation, heat transfer and the exchange of catalyst with bed 84 is completely controlled by the addition of fluidizing gas through distributor 102'. Although this arrangement only allows cooled catalyst particles to enter the second stage of regeneration, it simplifies the operation of the unit by eliminating an additional control valve and catalyst transfer line. In addition, it allows nozzle 32 to be used for receiving spent catalyst from reactor 64.

The description of this invention in the context of specific embodiments is not meant to limit the scope of this invention to those embodiments shown herein. In particular, the suggested reuse of various existing items of equipment such as cyclones, air distributors, and catalyst lines are not intended to limit the scope of this invention to a conversion that makes of specific items apart from the regenerator vessel, reactor vessel, and stripper vessel.

I claim:

1. A method of converting a stacked FCC reactor-regenerator arrangement into a two-stage regenerator, comprising providing a stacked FCC arrangement having a bottom regenerator vessel, a superadjacent reactor vessel, an external conduit for withdrawing catalyst from a lower portion of said regenerator vessel and transporting catalyst to said reactor vessel, means for injecting a hydrocarbon feed into said external conduit, means for adding spent catalyst to said hydrocarbon feed into said external conduit, means for adding spent catalyst to said regenerator vessel, means for recovering regeneration gas from an upper portion of said regenerator vessel, means for withdrawing hydrocarbon vapor from an upper portion of said reactor vessel, and a stripping vessel laterally offset from and in open communication with said reactor vessel, said method further comprising:

(a) modifying said reactor vessel to function as a second stage regeneration vessel by adding means for collecting catalyst to the lower portion of said reactor vessel, adding a catalyst withdrawal conduit that communicates with said catalyst collection means to a lower portion of said reactor vessel for withdrawing catalyst from said reactor vessel and replacing said means for withdrawing hydrocarbon vapor with means for withdrawing regeneration gas from the upper end of said reactor vessel;

(b) modifying said stripping vessel to function as an external removal zone by installing means for withdrawing heat from catalyst heat removal zone by installing means said stripping vessel and means for distributing fluidizing gas into said stripping vessel; and (c) replacing said means for injecting a hydrocarbon feed with means for injecting lift gas into said external conduit.

2. The method of claim 1 wherein a cooler conduit is added to said FCC arrangement for transferring catalyst from said heat removal zone to said bottom regeneration vessel.

3. The method of claim 1 wherein additional means for cooling catalyst are formed along the path of said external conduit.

4. The method of claim 1 wherein a side reactor vessel is placed next to and added to said stacked FCC reactor-regenerator arrangement, said side reactor having a riser arranged to receive regenerated catalyst from said catalyst withdrawal conduit communicating with said catalyst collection means and said side reactor having a stripping vessel arranged to supply spent catalyst to said means for adding spent catalyst to catalyst to said bottom regenerator vessel.

5. The method of claim 1 wherein said heat withdrawal means comprises a plurality of bayonette type heat exchanger tubes.

6. The method of claim 1 wherein said external heat removal zone comprises a backmix type cooler.

7. The method of claim 1 wherein said FCC arrangement has a conduit for communicating said heat removal zone with said bottom regeneration vessel.

8. The method of claim 1 wherein said means for injecting lift gas in step (c) includes means for injecting regeneration gas into said external conduit.

9. The method of claim 6 wherein an additional conduit is added to said FCC arrangement for transferring catalyst from said external heat removal zone to said bottom generator vessel and means for cooling catalyst are formed in said FCC arrangement along the path of said additional conduit.

* * * * *

UNITED STATES PATENT AND TRADEMARK OFFICE
CERTIFICATE OF CORRECTION

PATENT NO. : 4,859,424
DATED : August 22, 1989
INVENTOR(S) : Cabrera

It is certified that error appears in the above-identified patent and that said Letters Patent is hereby corrected as shown below:

In Column 10, line 15: Delete "means";

lines 17-18: Delete "means for adding spent catalyst to said hydrocarbon feed into said external conduit";

lines 36-41, should read--
b) modifying said stripping vessel to function as an external catalyst heat removal zone by installing means for withdrawing heat from said stripping vessel and means for distributing fluidizing gas into said stripping vessel; and --.

Signed and Sealed this

Seventh Day of August, 1990

*Attest:*

HARRY F. MANBECK, JR.

*Attesting Officer*     *Commissioner of Patents and Trademarks*